Sept. 5, 1933.　　　D. L. FULLERTON　　　1,925,241
ANTIDRIP COASTER
Filed March 2, 1932
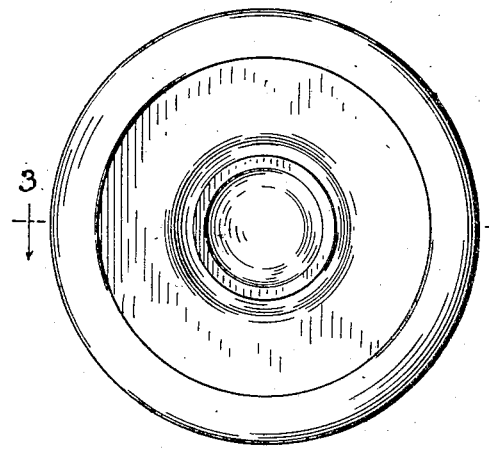
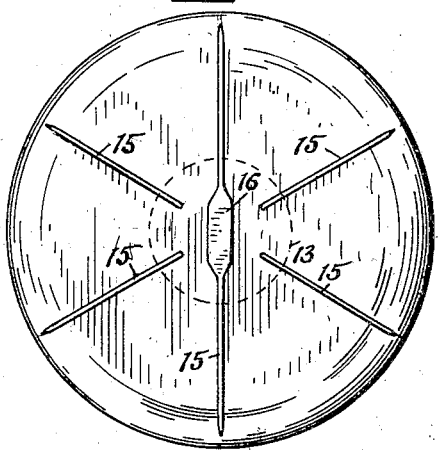
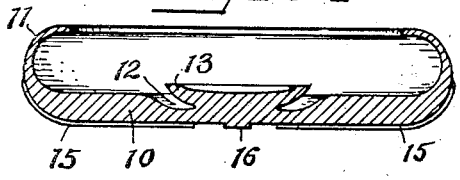
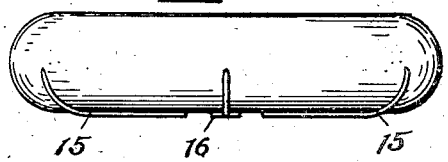
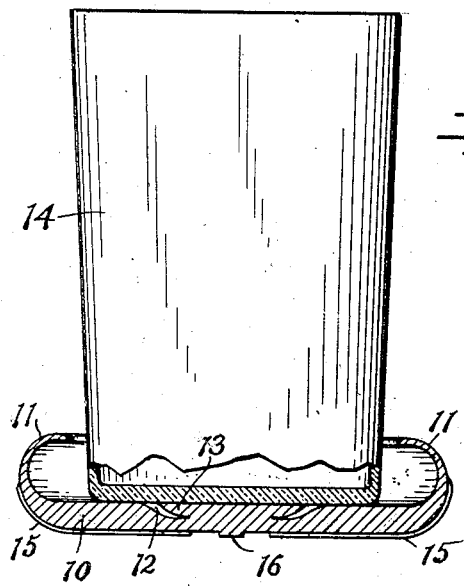
Inventor:
DWIGHT L. FULLERTON.
Kurs Hudson & Kent
attys.

Patented Sept. 5, 1933

1,925,241

UNITED STATES PATENT OFFICE 1,925,241

ANTIDRIP COASTER

Dwight L. Fullerton, Cleveland Heights, Ohio

Application March 2, 1932. Serial No. 596,299

2 Claims. (Cl. 65—53)

This invention relates to coasters for use with individual drinking glasses, bottles, etc., and for analogous purposes it has for one of its objects the provision of a relatively simple device that will prevent the condensation which commonly forms on the outside of the glass or bottle containing the cold liquid, from dripping off and soiling table linen etc.

A further object of the invention is to provide a device of this kind which is adapted to automatically attach itself to a glass or the like when the latter is placed in it.

A further object of the invention is to provide a device of this kind which will be comparatively simple and inexpensive to manufacture and which will be so constructed that it will not tend to stick to a table or other surface on which it is placed and which, nevertheless, will not skid or slip thereon.

Other objects and the features of novelty will be apparent from the following description taken in connection with the accompanying drawing, of which Figure 1 is a top plan view of a coaster embodying my invention;

Fig. 2 is a bottom plan view thereof;

Fig. 3 is a transverse section on the line 3—3 of Fig. 1;

Fig. 4 is a side elevation; and

Fig. 5 is a view similar to Fig. 3 but showing a glass in position in and attached to the coaster.

Referring to the drawing, the coaster comprises a disk-like base 10 having an upstanding inwardly curved peripheral flange 11 and a central recess 12 in its upper side. The coaster is made of pliable rubber and centrally arranged in the recess 12 is a vacuum cup 13 which, as shown in Fig. 3, normally projects slightly above the top of the base 10.

When a glass 14 is set in the coaster, as shown in Fig. 5, the vacuum cup 13 is depressed into the recess 12 and, the air being forced out of the recess in the upper surface of the vacuum cup, the latter will be caused, by suction, to adhere to the bottom of the glass.

The provision of the recess 12 and the arrangement of the vacuum cup 13 so that it may be depressed into the recess, insures that the glass will be firmly supported on the base 10, as shown in Fig. 5. The inwardly curved flange 11 insures that any condensation that accumulates on the exterior of the glass will be retained within the coaster when the latter is tilted, as for drinking therefrom.

Since the coaster is made of pliable rubber it would have a tendency to conform to any surface on which it was placed, and, if the surface happened to be wet, the coaster would tend to stick to the surface for the same reason that the vacuum cup 13 would stick to the glass 14. In order to avoid having the coaster stick to a table or other surface and thereby insure that it may at all times be freely lifted, by means of the glass 14, I have provided on the bottom of the coaster a series of ribs 15 which are preferably arranged radially, although they might be arranged otherwise and accomplish the same purpose. The ribs 15 insure that the base 10 will always be above any surface on which the coaster is placed and that there will be an air space under the base which will prevent the coaster from sticking to the surface even though the latter is wet.

It is desirable to have the vacuum cup 13 so supported that when a glass is placed in the coaster, the vacuum cup will be caused to adhere to it by simply pressing down on the glass and, for this purpose, I have provided on the bottom of the coaster a pad 16 which is arranged directly below the vacuum cup and which may be of any desired shape so long as it is capable of supporting the vacuum cup so that when a glass is pressed down onto the latter the air will be forced out of the vacuum cup. From the drawing it will be noted that the pad 16 of substantially the same height as the ribs 15.

Having thus described my invention, I claim:

1. A coaster for drinking glasses and the like, consisting of a pliable rubber base having a central recess in its upper surface and an upstanding peripheral flange, a vacuum cup in said recess and normally projecting above said surface but adapted to be depressed substantially to the plane of said surface, and the bottom surface of said base having a series of radially arranged ribs so positioned as to support said bottom surface above a surface on which the coaster is positioned.

2. A coaster for drinking glasses and the like, consisting of a pliable rubber base having a central recess in its upper surface and an upstanding peripheral flange, a vacuum cup in said recess and normally projecting above said surface but adapted to be depressed substantially to the plane of said surface, the bottom surface of said base having a series of ribs so positioned as to support said bottom surface above a surface on which the coaster is positioned, and a supporting pad on said bottom surface directly beneath said vacuum cup.

DWIGHT L. FULLERTON.